United States Patent
Makam et al.

(10) Patent No.: US 7,352,758 B2
(45) Date of Patent: Apr. 1, 2008

(54) DYNAMIC BANDWIDTH MANAGEMENT USING SIGNALING PROTOCOL AND VIRTUAL CONCATENATION

(75) Inventors: Srinivas V. Makam, Naperville, IL (US); Gary L. Davis, Pine Village, IN (US); Corey M. Parollina, Batavia, IL (US); Dmitry Levandovsky, Northbrook, IL (US)

(73) Assignee: Tellabs Operations, Inc., Naperville, IL (US)

( * ) Notice: Subject to any disclaimer, the term of this patent is extended or adjusted under 35 U.S.C. 154(b) by 377 days.

(21) Appl. No.: 09/784,499

(22) Filed: Feb. 15, 2001

(65) Prior Publication Data
US 2001/0033570 A1 Oct. 25, 2001

Related U.S. Application Data

(60) Provisional application No. 60/183,487, filed on Feb. 18, 2000.

(51) Int. Cl.
*H04L 12/56* (2006.01)
(52) U.S. Cl. .................................. 370/405; 398/56
(58) Field of Classification Search ................ 370/229, 370/230, 230.1, 235, 236, 236.1, 236.2, 395.2, 370/373, 395.21, 465, 468, 522
See application file for complete search history.

(56) References Cited

U.S. PATENT DOCUMENTS

| | | | |
|---|---|---|---|
| 4,764,921 A * | 8/1988 | Graves et al. ............... | 370/510 |
| 6,195,367 B1 * | 2/2001 | Jakobik et al. ............. | 370/535 |
| 6,633,573 B1 * | 10/2003 | Ben-Zur et al. ............. | 370/405 |
| 6,636,529 B1 * | 10/2003 | Goodman et al. .......... | 370/469 |
| 6,697,373 B1 * | 2/2004 | Sandstrom ................... | 370/405 |
| 6,700,900 B1 * | 3/2004 | Turban ....................... | 370/465 |
| 6,785,766 B1 * | 8/2004 | Ben-Zur et al. ............. | 711/104 |
| 6,959,000 B1 * | 10/2005 | Lee ............................ | 370/404 |
| 6,999,479 B1 * | 2/2006 | Jha ............................. | 370/535 |
| 7,016,379 B2 * | 3/2006 | Falkenstein et al. ........ | 370/535 |
| 2002/0018269 A1 * | 2/2002 | Chaudhuri et al. ......... | 359/165 |

(Continued)

FOREIGN PATENT DOCUMENTS

EP 0425146 * 5/1991

(Continued)

OTHER PUBLICATIONS

Changcheng Huang, Carleton University Vishal Sharma, Metanoia, Inc.Ken Owens, Erlang Technology, Inc.Srinivas Makam, Tellabs Operations, Inc.Building reliable MPLS networks using a path protection mechanismDept. of Syst. & Comput. Eng., Carleton Univ., Ottawa, Ont.;This paper appears in: Communications Magazine, IEEE Publication Date: Mar. 2002.*

(Continued)

*Primary Examiner*—Edan Orgad
*Assistant Examiner*—Salman Ahmed
(74) *Attorney, Agent, or Firm*—Hamilton, Brook, Smith & Reynolds, P.C.

(57) ABSTRACT

A communication system (10) employs switching circuits, such as an add/drop multiplexer (70) and another add/drop multiplexer (110). The bandwidth of a circuit switched connection between the switching circuits is altered without taking down the connection.

29 Claims, 1 Drawing Sheet

U.S. PATENT DOCUMENTS

2002/0041604 A1* 4/2002 Ferguson .................. 370/466
2002/0080445 A1* 6/2002 Falkenstein et al. ........ 359/127
2003/0035411 A1* 2/2003 Moy et al. ................. 370/352
2006/0221811 A1* 10/2006 Allasia et al. .............. 370/216

FOREIGN PATENT DOCUMENTS

| EP | 0451400 | * | 10/1991 |
|---|---|---|---|
| WO | WO9935803 | * | 7/1999 |
| WO | WO 01/29685 | * | 4/2001 |
| WO | WO 01/30000 | * | 4/2001 |
| WO | WO129682 | * | 4/2001 |

OTHER PUBLICATIONS

Okanoue et al. SONET self-healing networks for STS-1/Nc path restoration, Communications, 1992. ICC 92, Conference record, SUPERCOMM/ICC '92, Discovering a New World of Communications. IEEE International Conference on Jun. 14-18, 1992 pp. 1659-1664 vol. 3.*

Doverspike, et al. Network design sensitivity studies for use of digital cross-connect systems in survivable network architectures; Selected Areas in Communications, IEEE Journal on vol. 12, Issue 1, Jan. 1994 pp. 69-78.*

Bellary et al. Intelligent transport network survivability: study of distributed and centralized control techniques using DCS and ADMs; Global Telecommunications Conference, 1990, and Exhibition. 'Communications: Connecting the Future', GLOBECOM '90., IEEE; Dec. 2-5, 1990 pp. 1264-1268 vol. 2.*

Awduche, et al., "Extensions to RSVP for LSP Tunnels", Internet Draft, draft-ietf-mpls-rsvy-lsp-tunnel-08.txt, (Feb. 2000).

Bernstein, Some Comments on the Use of MPLS Traffic Engineering for SONET/SDH Path Establishment, Internet Draft, draft-bernstein-mpls-sonet-00.txt. Work in Progress (Mar. 2000).

Jamoussi, et al., "Constraint-Based LSP Setup Using LDP", Internet Draft, draft-ietf-mpls-cr-ldp-03.txt, (Sept. 1999).

Jones, et al., "Extending PPP over SONET/SDH, with Virtual Concatenation, high order and low order payloads", Internet Draft, draft-ietf-pppext-posvcholo-01.txt (Dec. 1999).

Levandovsky, et al., "Physical Constraints Affecting Connectivity in the Dynamic Optical Network" NFOEC 2000 (Aug. 2000).

Makam, et al., "Dynamic Control of Sonet/SDH/DWDM Transport Networks to Carry Data Traffic More Efficiently" pp. 358-367 (Oct. 2000).

Mannie, "MPLS for SDH Control", Internet Draft, draft-mannie-mpls-sdh-control-00.txt, Work in Progress (Mar. 2000).

Moy, "OSPF Version 2", FRC 2328, Internet Engineering Task (Apr. 1998).

Walker, et al. "Control Plane Integration of Multi Layer Networks", NFOEC 2000, (Aug. 2000).

* cited by examiner

FIG. 1

DYNAMIC BANDWIDTH MANAGEMENT USING SIGNALING PROTOCOL AND VIRTUAL CONCATENATION

CROSS-REFERENCE TO RELATED APPLICATIONS

The applicants claim the benefit of prior provisional application No. 60/183,487, entitled "DYNAMIC CONTROL OF EXISTING SONET/SDH TRANSPORT NETWORKS TO CARRY DATA TRAFFIC MORE EFFICIENTLY" filed Feb. 18, 2000, in the names of Srinivas V. Makam, Gary L. Davis and Corey M. Parollina.

BACKGROUND OF THE INVENTION

This invention relates to communication networks, and more particularly relates to switching data of varying bandwidths in such networks.

Ever since the first intelligent transport network devices were installed into a Service Provider network, there has been a need for a robust, remote/automatically controlled network. The need was for a network that permitted remote maintenance and provisioning to improve time to repair and service installation intervals.

The initial intelligent devices were Electronic Digital Cross connects (EDSX) and certain versions of DS1 Digital terminating Banks (D-Banks). These devices by themselves offered some level of remote control but the network was still saturated with devices that required on site manual effort for maintenance and provisioning which prevented any real progress towards the vision.

SONET/SDH was the first real opportunity to make major steps towards meeting the need. This new technology included Broadband Digital Cross connect Systems (BDCS), Wideband Digital Cross connect Systems (WDCS) and intelligent fiber optic terminal equipment with varying degrees of cross connect capabilities. The intelligence capabilities of these devices along with the ability to make cross connections remotely were helpful to meet the need. However, more than just network infrastructure was required to meet the need. There has to be operational support systems in place that provide the necessary administrative and control capabilities necessary for this automatically controlled network.

At the same time that national and international standards were being developed for SONET/SDH, efforts to define a set of standards for such an operational support infrastructure were also undertaken. These efforts led to the development of the Telecommunications Management Network (TMN). This TMN concept is based on a top down approach to network management. The TMN infrastructure includes a layered approach to solving the problem of operational support in an automatically controlled, multi-vendor network. The proposed layers within the TMN includes the following:

Element Layer—This is the actual network element, for example BDCS, WDCS SONET terminal.

Element Management (EM) Layer—This layer of management provides control and coordination of a subset of network elements along with providing the mediation function between the elements and the Network Management layer.

Network Management (NM) Layer—Controls and coordinates the network view of all elements within a domain. This layer provision, connects, disconnects, and modifies network capabilities for service to the customer among other functions.

Service Management Layer (SM)—This layer provides the point of contact for the customers, management of the services provided, billing, service integration and other important functions Business Management Layer (BM)—This layer provides for the total enterprise responsibility along with strategic planning functions.

This work to develop all that is required for the TMN has been very complex and has moved forward slowly. One of the areas of most contention has been and still is the connection between the Element Management layer and the Network Management layer. This should probably be expected since this is the boundary point of responsibilities between the Transport Network Element and Element Manager vendor's proprietary domain and the Operational System Support Vendor's domain. The problems encountered at this interface have contributed to the inability of the Service Providers to meet the need. Some Operations Support System vendors have attempted to alleviate this problem by incorporating the Element Management layer into the Network Management Layer. This is at best difficult. First, obtaining the necessary agreements between the OSS vendor and the element vendor to facilitate the necessary development work is difficult to obtain. Designing the function for a set of elements is a very lengthy process and each vendor's equipment may require a customized solution since the interface between the element and the EMS is proprietary. In addition, this approach does not promote the timely introduction of new features and functions into network elements because of the lag time that exist between the development in the elements and the developments needed to support the features and functions in the EMS.

Some of the Regional Bell Operating Companies (RBOCs) rely on a set of tools, some of which were developed prior to any intelligent network devices. These tools have been modified to accommodate some of the capabilities of the intelligent devices but it is a slow process that results in only a limited set of functions. Some Network Providers have designed their own in house systems. These may provide a potential solution for any given point in time but given all the different Element Vendors that exist and the speed at which technology is changing, it is a monumental task keeping the systems current. Some Network Providers have purchased the TMN based systems that incorporate both the EMS and NMS layers as described above and these Providers face the problems included in the discussions above.

This invention addresses the foregoing problems and provides a solution.

BRIEF SUMMARY OF THE INVENTION

The preferred embodiment is useful in a communication system. In such a system, the bandwidth of a circuit switched connection can be changed without taking down the connection by providing a system comprising a network management system arranged to issue a connection request effective during a first time period and a connection modify command effective during a second time period. The system further comprises a first switching circuit comprising a first interface and a second interface. The first switching circuit is arranged to:

receive a first data group and a second data group at the first interface, be responsive to the connection request during the first time period to reserve first resources for transmitting the first data group between the first and second interfaces and to launch a first path setup message using a signaling protocol, and be responsive to the modify command during the second time period to reserve virtually concatenated second resources for transmitting the first and second data groups between the first and second interfaces and to launch a second path setup message using the signaling protocol.

The system also comprises a second switching circuit comprising a third interface and a fourth interface. The second switching circuit is arranged to:

receive the first data group and the second data group at the third interface, be responsive to the first path setup message during the first time period to reserve third resources for transmitting the first data group between the third and fourth interfaces, and be responsive to the second path setup message during the second time period to reserve virtually concatenated fourth resources for transmitting the first and second data groups between the first and second interfaces. The system also comprises at least one network coupling the network management system, first switching circuit and second switching circuit.

Another embodiment of the invention includes a comparable method of varying the bandwidth of a circuit switched connection can be changed without taking down the connection.

By using the foregoing techniques, the bandwidth of connections can be varied on demand with a degree of economy and convenience previously unavailable.

DETAILED DESCRIPTION OF THE PREFERRED EMBODIMENTS

The preferred embodiments are explained in part by reference to the following papers that are incorporated by reference in their entirety into this specification:

[1] G. Bernstein, "Some Comments on the Use of MPLS Traffic Engineering for SONET/SDH Path Establishment", Internet Draft, draft-bernstein-mpls-sonet-00.txt, Work In Progress, March 2000.

[2] E. Mannie, "MPLS for SDH Control", Internet Draft, draft-mannie-mpls-sdh-control-00.txt", Work In Progress, March 2000.

[3] N. Jones, C. Murton, "Extending PPP over SONET/SDH, with Virtual Concatenation, higher order and low order payloads", Internet Draft, draft-ietf-pppext-pos-vcholo-01.txt, December 1999.

[4] W. Walker, B. Mack-Crane, S. Steele, "Control Plane Integration of Multi Layer Networks", NFOEC 2000, August 2000.

[5] J. Moy, "OSPF Version 2", RFC 2328, Internet Engineering Task Force, April 1998.

[6] D. Levandovsky, S. Makam, V. Sharma, "Physical Constraints Affecting Connectivity in the Dynamic Optical Network", NFOEC 2000, August 2000.

[7] D. O. Awduche, et al., "Extensions to RSVP for LSP Tunnels", Internet Draft, draft-ietf-mpls-rsvp-lsp-tunnel-05.txt, February 2000.

[8] B. Jamoussi, et al., "Constraint-Based LSP Setup Using LDP", Internet Draft, draft-ietf-mpls-cr-ldp-03.txt, September 1999.

Figure 1:
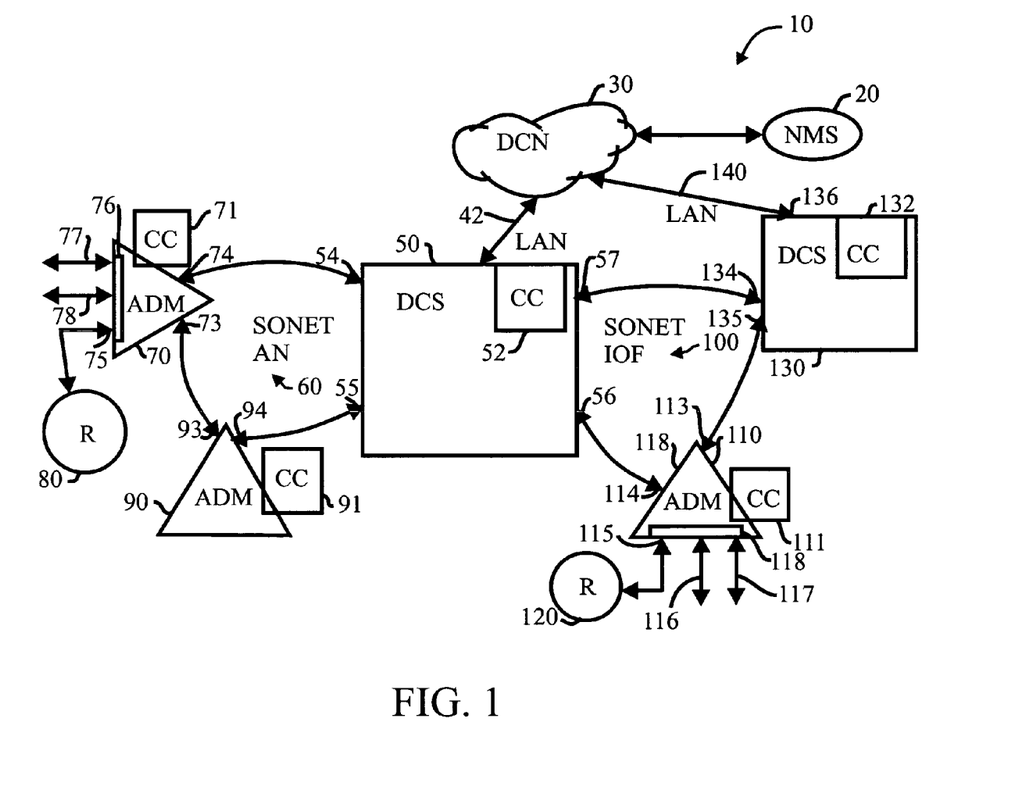
FIG. 1 illustrates a preferred form of communication system embodying the invention.

Referring to FIG. 1, a preferred form of communication system 10 made in accordance with the invention comprises a network management system (NMS) 20 that is interconnected with a data communication network (DCN) 30. DCN 30 is connected by a network, such as a local area network (LAN) 42, to a digital cross-connect system (DCS) 50. DCS 50 includes a control component (CC) 52 and interfaces 54-57. In this preferred embodiment, DCS 50 acts as a gateway network element to relay commands from NMS to other network elements in the SONET network.

DCS 50 is connected over a synchronous optical network (SONET) 60, which functions as an access network (AN), to an add/drop multiplexer (ADM) 70. ADM 70 includes a control component (CC) 71, interfaces 73-75 and buffers 76. Interfaces 73-75 and inputs 77-78 can receive data. A router (R) 80 is connected to interface 75 as shown.

ADM 70 is connected over network 60 to another add/drop multiplexer (ADM) 90. ADM 90 includes a control component (CC) 91 and interfaces 93-94.

DCS 50 is connected over a SONET inter-office facility (IOF) 100 to another add/drop multiplexer (ADM) 110. ADM 110 includes a control component (CC) 111, interfaces 113-115 and buffers 118. A router (R) 120 is connected to interface 115 as shown.

ADM 110 is connected over IOF 100 to another digital cross-connect system (DCS) 130. DCS 130 includes a control component (CC) 132 and interfaces 134-136. DCS 130 is connected to DCN 30 by a local area network (LAN) 140.

A new SONET VT1.5 circuit switched connection between ADM 70 and ADM 110 via ADM 90 and DCS 50 preferably is set up to carry a first data group in the following manner.

NMS 20 initiates a connection create command via DCN 30 to ADM 70 via the gateway element DCS 50. DCS 50, using its CC (Control Component) 52 relays the NMS command to ADM 70 via the SONET DCC channel on interface 54. ADM 70 receives the connection create command on the SONET DCC channel of interface 74, and reserves resources for a VT1.5 connection between interfaces 75 and 73. CC 71 then launches a VT1.5 path setup message using a signaling protocol such as LDP (Label Distribution Protocol) towards ADM 90 via the SONET DCC on interface 73.

ADM 90 receives the path setup message on interface 93 and reserves resources for a VT1.5 path between interfaces 93 and 94. ADM 90 then forwards the path setup message to DCS 50 on the DCC channel of SONET interface 94.

DCS 50 receives the path setup message on interface 55, and reserves resources for a VT1.5 connection across interfaces 55 and 56. CC 52 then forwards the path setup message to ADM 110 on the DCC channel of interface 56.

When ADM 110 receives the path setup message on interface 114, CC 111 reserves resources for a VT1.5 path between interfaces 114 and 115. It also creates a VT1.5 connection between interfaces 114 and 115. ADM 110 then launches a path reserve/acknowledge message to ADM 70 via the SONET DCC channel on interface 114.

DCS 50 receives the path acknowledge message on interface 56 and completes the VT1.5 cross-connection between interfaces 55 and 56. DCS 50 then forwards the path acknowledge message to ADM 90 via the DCC channel on interface 55.

ADM 90 receives the path acknowledge message from DCS 50 and CC 91 completes the VT1.5 connection between interfaces 93 and 94. ADM 90 the path acknowledge message to ADM 70 via its interface 93.

ADM 70 receives the path acknowledge message on interface 73 and CC 71 completes the VT1.5 connection between interfaces 75 and 73. Finally, ADM 70 sends a connection complete response to NMS 20 via DCS 50 using the DCC channel on the SONET interface 74.

Now, Router 80 can exchange data with Router 120 at a first bandwidth using the single VT1.5 connection, established in the SONET circuit switched network between ADM 70 and ADM 110.

The bandwidth of the single VT1.5 connection between ADM 70 and ADM 110 can be increased to a 4×VT1.5 connection without taking down the single VT1.5 connection by using the following procedure. NMS 20 issues a connection modify command to ADM 70 via DCN 30 and the DCS 50 gateway element. DCS 50 forwards the NMS command to ADM 70 via the DCC channel on interface 54.

ADM 70 verifies the resources for a 4×VT1.5 connection between interfaces 75 and 73, and then sets up virtually concatenated VT1.5 channels with appropriate control information, such as a concatenated group ID and its position/sequence within the group. The control information is used to reconstruct the data in the four VT1.5 channels at ADM 110. ADM 70 also reserves enough of buffers 76 on the receive side to handle any differential delays. ADM 70 then launches a path setup message for a new 3×VT1.5 connection to ADM 110 via ADM 90.

ADM 90 receives the path setup message on interface 93 and reserves resources for an additional 3×VT1.5 connection between interfaces 93 and 94. ADM 90 then forwards the path setup message to DCS 50 on interface 94.

DCS 50 receives the path setup message for a new 3×VT1.5 connection and reserves resources for the same between interfaces 55 and 56. DCS 50 then forwards the path setup message to ADM 110 on interface 56.

ADM 110 receives the path setup message for the 3×VT1.5 connection with additional information regarding the virtual concatenation with an existing VT1.5 connection between interfaces 114 and 115.

ADM 110 completes the 4×VT1.5 connection between interfaces 114 and 115 by reserving buffers 118 in the receive direction as well as setting up appropriate control information, such as a concatenated group ID and its position/sequence within the group.

ADM 110 then launches a path acknowledge message towards DCS 50 on interface 114.

DCS 50 receives the path acknowledge message from ADM 110 and completes a new 3×VT1.5 connection between interfaces 55 and 56. DCS 50 then forwards the path acknowledge message to ADM 90 on interface 55.

ADM 90, after receiving path acknowledge message from DCS 50 completes the 3×VT1.5 connection between interfaces 93 and 94 and then forwards the path acknowledge message to ADM 70 on interface 93.

ADM 70 receives the path acknowledge message and completes the 4×VT1.5 virtually concatenated connection between interfaces 75 and 73. ADM 70 then sends a connection update complete response to NMS 20 via DCS 50 using the SONET DCC channel on interface 74.

Now, Router 80 and Router 120 can exchange data at a higher rate (e.g., a broader second bandwidth greater than the first bandwidth using the single VT1.5 channel) using the 4×VT1.5 connection between ADM 70 and ADM 110.

By using the foregoing structure and procedure, the preferred embodiment enables the ever-growing Internet data traffic (IP and ATM) to be more efficiently carried through the SONET/SDH/DWDM infrastructure. By using fast signaling protocols and virtual concatenation of TDM and WDM channels, the preferred embodiment substantially reduces the operational costs, decreases the circuit provisioning time and increases revenues by making low cost upgrades to the existing infrastructure (for example, adding CC to a SONET network element).

As previously explained, fast signaling and routing protocols can be utilized to setup communication channels through the TDM or WDM network instead of static (manual) provisioning. The dynamic channel setup can be extended for fast provisioning of DS-1 and DS-3 private line services across SONET/SDH as well as optical wavelengths across WDM networks.

By using dynamic protocols to establish paths through the TDM and WDM networks, quality of service (QoS) can be improved and the flexibility of the signaling protocols used in the preferred embodiment take into account the physical constraints so that the suitable paths can be determined enroute.

The principles of the preferred embodiment employed in SONET/SDH/DWDM networks also can be employed in other types of networks generally referred to as transport networks in the rest of this specification.

The preferred embodiment provides many benefits. Some benefits are expected from projected network trends. The trend that will provide the most incentive for such a service is the growth of the Internet and other data traffic. Considering this, both the customer and the Service Provider would see a major benefit from the preferred embodiment in the time it takes to establish service. Customers would also see a benefit in the fact that they only need to pay for the level of service required, as it is required. The Service provider would see a benefit in the fact that the capacity required in the network can be maximized for efficiency.

For example, the data user requirements will have varying periods where the capacity demands are at a peak. Since these peak periods will vary over all users, capacity that serves one user having a particular peak period can be utilized to satisfy other users having different peak periods. A second advantage for the Service Provider is that, since this is a shared bandwidth network; like the voice network, certain pricing strategies can be implemented that would have the potential to increase revenues. Finally, depending on how the Service Provider decides to implement the capability, other private line services can be provisioned using this control plane. This would substantially reduce the provisioning time required for the involved private line services.

Even though the current SONET/SDH networks excel in the PM (performance monitoring) and FM (fault management) areas, they don't excel in the areas of automatic neighbor/resource discovery and topology distribution. If the resource utilization information is disseminated along with the link states then a very complete picture of network status is available to a network operator for use in planning, provisioning and operations.

A common fast signaling protocol, such as SS7, PNNI, RSVP-TE [7], or CR-LDP [8] properly extended for circuit switching application preferably is used in the preferred embodiment. Such protocols solve the (management) interoperability problem for provisioning of circuits.

Another major benefit of the preferred embodiment is the dynamic bandwidth management of circuit connections. It is the ability to modify the bandwidth resources of existing connections to carry bursty data traffic in a TDM network that can create efficiencies.

By using the preferred embodiment, a dynamic control plane in new generation of optical transport networks [4] can achieve a fully dynamic transport network with the following functions:

An automatic neighbor discovery and link state maintenance mechanism;

A topology distribution with link and node constraints;

Route computation (for each circuit or path) satisfying a set of constraints;

Automatic path or circuit setup and tear down procedures along with the ability to modify and abort connections;

Automatic shared mesh protection switching to handle node or link faults; and

Automatic synchronization of dynamic provisioning of circuits with EMS/NMS inventory systems.

In addition, to transport IP data traffic more efficiently, more granularity in SONET/SDH networks than what is defined currently is desired. The following capabilities provided by the preferred embodiment improve bandwidth efficiency and handling.

Contiguous concatenation;

Virtual concatenation;

Arbitrary concatenation;

Bundled connections;

Stacking and Tunneling of lower order TDM channels in higher order channels;

The preferred embodiment takes the large installed base of transport networks into consideration. There is no economic driver for a wholesale redesign of SONET Network Elements and to make them behave as Label Switch Routers. The preferred embodiment is an economical way to upgrade the existing NEs (by adding a control component) to provide a more dynamic establishment of n*VT1.5, STS-N and n*STS-1 paths and to carry the data traffic more efficiently.

In typical data networks, a portion of the link bandwidth is used for the purpose of neighbor discovery, link maintenance, topology distribution, session establishment, path setup and rerouting or path protection. In SONET networks, the STS SPE (synchronous payload envelope) is typically not available for network control and management. As a result, the preferred embodiment uses spare capacity available in Line or Section Overhead bytes of the SONET frame. Alternatively, the preferred embodiment uses the SONET DCC. Some of the existing systems in the field may not permit the use of this spare overhead capacity and as a result, this may be a constraint in implementing dynamic control for these networks.

Some of the possible overhead fields that can be used to carry control information are: J0—trace byte to carry node ID, Section DCC—unused bandwidth for control, Line DCC—to carry new IP-based control protocol. The preferred embodiment establishes bidirectional control channels to maintain correct adjacency/peer relationships and also for link maintenance.

The preferred embodiment enables two ways to exchange the control information between the neighboring nodes:

Link associated (in-band) signaling using SONET/SDH overhead bytes, OTN optical supervisory channel, or OTN dedicated wavelength; and Separate (out-of-band) IP network, e.g., the Data Communication Network used for the network management.

The preferred embodiment provides the ability of the network elements to recognize their neighbors and links interconnecting them. Each network element has a physical address, which is important for inventory control, and a logical address, which is essential for locating the element within the overall topology of the network. The link interface address (or ID) is useful for link-specific communication and for link resource identification.

A link management protocol is used to maintain an up-to-date working status of the links between the adjacent nodes. This is a lightweight protocol preferably running on the link associated control channel such as the SONET DCC.

The various CCs (control components) shown in FIG. 1 use a dynamic routing protocol, such as OSPF to acquire neighbors using its Hello Protocol [5]. The control components also run a link management protocol and a signaling protocol.

Depending on the level of support that the SONET links provide in terms of ability to transport control and signaling information the following alternatives can be specified.

Intact SONET Transport Links typically exist on SONET regenerators, DWDM optical muxes and optical cross connects. Very basic link integrity monitoring capabilities may exist. In this case, NMS 20 configures each network element with some criteria to indicate neighbor identity and link identity.

Section Terminating SONET Transport Links typically exist on SONET ADMs, wideband cross connects and broadband cross connects supporting BLSR (bi-directional line switched ring) protection. In this case, a Section Overhead byte, such as J0, is used to transmit a node ID. The Section DCC bytes are used for sending OAMP information for managing the SONET network. The node ID, as well as link maintenance information, is tunneled via the Section DCC protocol currently defined.

Line Terminating SONET Transport Links are used on SONET ADMs, wideband cross connects supporting UPSR (unidirectional path switched ring) protection or APS (automatic protection switching). In this case, the preferred embodiment uses J0 to transmit the node ID or uses the Line DCC to support a new IP-based control protocol for neighbor discovery and link maintenance. Currently, some systems may not support access to Line DCC bytes and this may present a problem.

In path terminating equipment, such as a wideband cross connect or a SONET access mux, the SPE (synchronous payload envelope) is processed to extract VTs (virtual tributaries). In this case, the preferred embodiment uses Section or Line overhead bytes for neighbor discovery and link maintenance to provide Path Terminating SONET Transport Links.

A dynamic routing protocol such as OSPF [5] is used by the preferred embodiment to flood and exchange the link states, resource information and adjacency information to build a database of network topology. The routing protocol needs sufficient bandwidth available in the control network. If the SONET Line DCC is available, an OSPF/IP/PPP protocol stack can be easily supported. Otherwise, an out-of-band control network such as the DCN (data communication network) typically used for network management can be used. It is important to note the distinction that a neighbor on the DCN is not necessarily a neighbor on the SONET network. A separate instance of the routing protocol here processes strictly SONET link states and not DCN link states.

After acquiring neighbors using lower level protocols, each network element attempts to form adjacencies with some of its newly acquired neighbors. Link-state databases are synchronized between pairs of adjacent nodes. Routing updates are sent and received only on adjacencies. A node periodically advertises its link state or when its link state changes. From the link-state database each node calculates a shortest-path tree with itself as the root.

Although a Shortest Path First route database can be built using OSPF, the shortest paths are not always used as SONET paths. The preferred embodiment uses additional constraints such as—node/link capability to transport a desired signal, physical constraints as in [6], maximum number of regenerated hops, total propagation delay, link cost, bandwidth, resource class, priority, preemption, resilience (protection and restoration), and network load balance. All the nodes of the preferred embodiment have the ability to run basic path computation algorithm.

Explicit routes are dictated by NMS 20 when it initiates a circuit provisioning request to a network element. A client device such as Router 80 requesting a circuit connection may also specify a constrained route to satisfy its service level requirements. The network element when it receives path setup request from a client or the NMS, computes the complete path from itself to destination node, since, it does not know the full complement of constraints of a specific path.

Information that is needed between two adjacent network elements (e.g., ADMs 70 and 90) for the purposes of connection establishment is appropriate for distribution via a label distribution protocol. In SONET/SDH networks, this "virtual" label corresponds to the "time slot" or STS# agreed to be on a link between two adjacent nodes for a circuit. This "virtual" label is not appended to the payload signal but rather used to identify the signal local to the link. Similarly, "virtual" labels can be used to identify wavelength/optical channel in a fiber link.

As previously explained in connection with FIG. 1, fast signaling protocols are used to setup, maintain, modify/renegotiate and tear down these connections. There are several protocols available in the industry such as SS7 used in the public switched telephone network, PNNI used in the ATM networks, RSVP-TE[7] and CR-LDP[8] used in the IP/MPLS networks. PNNI allows traffic parameters such as bandwidth to be specified for a connection. Both RSVP-TE and CR-LDP support constraint-based routed label switched paths.

Transport networks need to be optimized to support data traffic patterns that comprise more than 50% of the total traffic and rising rapidly. Dynamic bandwidth management using both NMS initiated and client initiated signaling enable intervening network elements to increase or decrease bandwidth of a connection as needed. If a SONET circuit connection presently used a 2*STS-1 capacity, a signaling request to modify it to 3*STS-1 capacity can be sent from the source to the destination in the same manner explained previously for the VT1.5 connections.

The dynamic control architecture of the preferred embodiment, as explained in connection with FIG. 1, supports end-to-end SONET path protection and shared mesh protection, as well as existing linear APS, UPSR and BLSR recovery actions. The distributed routing protocol used for topology distribution can disseminate information on different protection methods enabled on different links. Use of that information enables setting up a connection that is "extra traffic" over unprotected channels and idle protection channels.

As previously explained in connection with FIG. 1, the preferred embodiment uses virtual concatenation of TDM channels, such as VT1.5 and STS-1, to dynamically build different bandwidth pipes to carry data traffic more efficiently. The preferred embodiment provides various functions needed at the transport network access points where the data traffic is mapped/extracted from the TDM channels.

The standard SONET concatenated STS signals are restricted to multiples of 3 (at STS3) and 4 (at STS12 and higher). This leads to bandwidth fragmentation and regrooming requirements in the network as well as bandwidth wastage when carrying finer grained traffic such as LANs and the Internet.

In SDH, the concatenation of contiguous signals in the multiplex is called the Contiguous Concatenation [2]. At present, contiguous concatenation caters for 4 or 16 VC-4s. In order to transport the services, such as transparent LAN services at 10 Mb/s, 100 Mb/s or 1 Gb/s, there is no match in the bandwidth granularity. There is one single POH column in a contiguous concatenation and one given payload type. In a signaling message to establish a connection (e.g., the connection between ADMs 70 and 110), a contiguously concatenated signal is specified by identifying the first signal and giving a subsequent number of signals to concatenate. All intermediate nodes (e.g., DCS 50) must support contiguous concatenation. Many installed network elements in SONET/SDH networks cannot support contiguous concatenation. To implement this capability would require a massive hardware upgrade and would be prohibitively expensive. The use of virtual concatenation by the preferred embodiment solves this problem.

Some SONET/SDH framer device manufacturers now support "arbitrary" concatenation with no restriction on the size of an STS-Mc (M<=N). Arbitrary concatenation includes arbitrary byte interleaving which avoids the need for link regrooming between pairs of nodes supporting this feature [1]. This is a network service potentially available in new deployments but not a part of the existing installed infrastructure. The use of virtual concatenation by the preferred embodiment solves this problem of unavailability of arbitrary concatenation.

Two end systems (path terminating equipment) supporting virtual concatenation would essentially "inverse multiplex" two STS-1s into a virtual STS-2c for efficient transport of 100 Mb/s Ethernet traffic [1]. It is transparent to the intermediate SONET/SDH network elements. At the sending end, the preferred embodiment provides each SPE/VC with information about its concatenated group ID and its position/sequence within the group, and gives each its own POH for processing in the intermediate nodes in the network [3]. At the receiving end, the equipment of the preferred embodiment is capable of identifying a SPE/VC as belonging to a particular concatenated group. Because of the likelihood of differential delays, the preferred embodiment receiving end equipment provides buffers (e.g., buffers 76 and 118) to store the incoming data until the latest SPE/VC arrives, when re-alignment can be performed.

A benefit of the virtual concatenation feature of the preferred embodiment is to provide multiple right sized channels over a SONET/SDH network for data traffic. Another benefit is the ability to add or remove a SPE/VC from the group without taking the connection down, allowing dynamic modification of bandwidth resources.

Connection bundling is the process of connecting a set of non-concatenated STS-1s together as a group [1]. All the STS-1s in the group are within the same SONET link or WDM signal and experience the same delay. This simplifies connection establishment of a batch of DS-3s that can be wholesaled. The preferred embodiment enables such bundling to be combined with virtual concatenation by the end systems to aid in handling protection. The "virtual" labels used for signaling incorporate connection bundling.

In IP/MPLS networks, one label switched path (LSP) can be tunneled through another LSP using label stacking. This concept can be extended to SONET/SDH transport networks, in which, low-order channels such as VT1.5s, can be tunneled through high-order channels, such as STS-1s. In a scenario where two broadband cross-connects are used as border nodes, and there is a need to establish a connection of VT1.5s across these border nodes between two wideband cross-connects, the preferred embodiment can be used to advantage. The client device requests the wideband cross-connect for a VT1.5 connection, and the wideband cross-connect maps this connection to a STS-1 tunnel existing between itself via the broadband cross-connects to another wideband cross-connect.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. In a communication system, apparatus for changing the bandwidth of a circuit switched connection without taking down the connection comprising:
   a network management system arranged to issue a connection create request effective during a first time period and a connection modify command effective during a second time period;
   a first switching circuit comprising a first interface and a second interface, the first switching circuit being arranged to
      receive data at the first interface,
      be responsive to the connection create request during the first time period to reserve first resources at a first bandwidth for transmitting the data between the first and second interfaces at the first bandwidth and to launch a first path setup message using a signaling protocol,
      be responsive to the modify command during the second time period to reserve virtually concatenated second resources at a second bandwidth greater than the first bandwidth for transmitting the data between the first and second interfaces at the second bandwidth and to launch a second path setup message using the signaling protocol,
      be responsive to a first path acknowledge message during the first time period to complete a first connection between first and second interfaces using the first resources, and
      be responsive to a second path acknowledge message during the second time period to complete a second connection between first and second interfaces using the second resources, the first and the second connections being combined as a virtually concatenated connection;
   a second switching circuit comprising a third interface and a fourth interface, the second switching circuit being arranged to
      receive the data at the third interface,
      be responsive to the first path setup message during the first time period to reserve third resources at the first bandwidth for transmitting the data between the third and fourth interfaces at the first bandwidth and to launch the first path acknowledge message using the signaling protocol, and
      be responsive to the second path setup message during the second time period to reserve virtually concatenated fourth resources at the second bandwidth for transmitting the data between the first and second interfaces at the second bandwidth and to launch the second path acknowledge message using the signaling protocol; and
   at least one network coupling the network management system, first switching circuit and second switching circuit.

2. A system, as claimed in claim 1, wherein the first and second switching circuits each comprise an add/drop multiplexer.

3. A system, as claimed in claim 1, wherein the first switching circuit comprises an add/drop multiplexer and wherein the second switching circuit comprises a digital cross-connect switch.

4. A system, as claimed in claim 1, wherein said at least one network comprises one or more of a SONET network, an SDH network and a WDM network.

5. A system, as claimed in claim 1, wherein the signal protocol is carried in one or more of a SONET DCC, SONET/SDH overhead bytes, an optical supervisory channel, and an out-of-band network.

6. A system, as claimed in claim 1, wherein the signal protocol comprises a fast signaling protocol.

7. A system, as claimed in claim 1, wherein the signal protocol comprises at least one of SS7, PNNI, RSVP-TE, and CR-LDP.

8. A system, as claimed in claim 1, wherein the first switching circuit transmits a first connection update complete signal to the network management system in response to the completion of the first connection using the first resources and transmits a second connection complete signal to the network management system in response to the completion of the second connection using the second resources.

9. A system, as claimed in claim 1, wherein the first resources comprise a predetermined VT data structure and the second resources comprise a multiple of the predetermined VT data structure.

10. A system, as claimed in claim 1, wherein the first resources comprise a predetermined STS data structure and the second resources comprise a multiple of the predetermined STS data structure.

11. A system, as claimed in claim 1, wherein the first and second switching circuits comprise buffers and wherein the first and second switching circuits reserve at least some of the buffers so that differential delays in the processing of the data are accommodated.

12. A system, as claimed in claim 1, wherein the first switching circuit transmits control information indicating a group ID and a group position for the data transmitted using the second resources.

13. In a data communication system comprising a first switching circuit and also comprising a second switching circuit, a method for changing the bandwidth of a circuit switched connection between the first and second switching circuits without taking down the connection comprising:

issuing a connection create request effective during a first time period and a connection modify command effective during a second time period;

responding to the connection create request during the first time period to reserve first resources at a first bandwidth for transmitting the data across the first switching circuit at the first bandwidth and to launch a first path setup message using a signaling protocol;

responding to the connection modify command during the second time period to reserve virtually concatenated second resources at a second bandwidth greater than the first bandwidth for transmitting the data across the first switching circuit at the second bandwidth and to launch a second path setup message using the signaling protocol;

responding to the first path setup message during the first time period to reserve third resources at the first bandwidth for transmitting the data across the second switching circuit at the first bandwidth and to launch a first path acknowledge message using the signaling protocol;

responding to the second path setup message during the second time period to reserve virtually concatenated fourth resources at the second bandwidth for transmitting the data across the second switching circuit at the second bandwidth and to launch a second path acknowledge message using the signaling protocol;

responding to the first acknowledge message during the first time period to complete a first connection across the first switching circuit using the first resources;

responding to the second acknowledge message during the second time period to complete a second connection across the first switching circuit using the second resources; and coupling the first and second switching circuits.

14. A method, as claimed in claim 13, wherein the first and second switching circuits each comprise an add/drop multiplexer.

15. A method, as claimed in claim 13, wherein the first switching circuit comprises an add/drop multiplexer and wherein the second switching circuit comprises a digital cross-connect switch.

16. A method, as claimed in claim 13, wherein the system comprises one or more of a SONET network, an SDH network and a WDM network and wherein the coupling comprises coupling the first and second switching circuits with one or more of the SONET network, the SDH network and the WDM network.

17. A method, as claimed in claim 16, wherein the signal protocol is carried in one or more of a SONET DCC, SONET/SDH overhead bytes, an optical supervisory channel, and an out-of-band network.

18. A method, as claimed in claim 13, wherein the signal protocol comprises a fast signaling protocol.

19. A method, as claimed in claim 13, wherein the signal protocol comprises at least one of SS7, PNNI, RSVP-TE, and CR-LDP.

20. A method, as claimed in claim 13, and further comprising transmitting a first connection complete signal in response to the completion of the first connection using the first resources and transmitting a second connection complete signal in response to the completion of the second connection using the second resources.

21. A method, as claimed in claim 13, wherein the first resources comprise a predetermined VT data structure and the second resources comprise a multiple of the predetermined VT data structure.

22. A method, as claimed in claim 13, wherein the first resources comprise a predetermined STS data structure and the second resources comprise a multiple of the predetermined STS data structure.

23. A method, as claimed in claim 13, and further comprising buffering at least some of the data so that differential delays in the processing of the data are accommodated.

24. A method, as claimed in claim 13, and further comprising transmitting control information indicating a group ID and a group position for the data transmitted using the second resources.

25. A communication system including:

a network management system;

a digital cross-connect in communication with the network management system; and a synchronous optical network including a first add/drop multiplexer and a second add/drop multiplexer, the synchronous optical network in communication with the digital cross-connect, wherein the network management system uses the digital cross-connect to initiate a connection create command at the first add/drop multiplexer, wherein the first add/drop multiplexer reserves resources for the connection in response to the connection create command, wherein the digital cross-connect then transmits a path setup message to the second add/drop multiplexer using the synchronous optical network to establish a path between the first add/drop multiplexer and the second add/drop multiplexer, wherein the second add/drop multiplexer sends a path acknowledge to the digital cross-connect once the second add/drop multiplexer has reserved resources for the connection specified by the oath setup message, wherein the path acknowledge is received by the digital cross-connect and the digital cross-connect then reserves resources for the connection specified by the path setup message, and wherein the digital cross-connect then forwards the path acknowledge message to the first add/drop multiplexer and the first add/drop multiplexer then completes the connection.

26. The system of claim 25 wherein the connection create command establishes a virtual tributary connection.

27. The system of claim 25 wherein digital cross-connect launches the path setup message to the second add-drop multiplexer.

28. The system of claim 25 wherein the first add/drop multiplexer sends a connection complete response to the digital cross-connect once the connection has been completed.

29. In a data communications system, a method for changing the bandwidth of an existing circuit switched connection between a first switching circuit and a second switching circuit without taking down the existing connection, the method comprising:

launching a connection modify command from a network management system via a digital cross-connect to the first switching circuit;

reserving first additional resources for the existing connection at the first switching circuit and launching a path setup message from the first switching circuit to the digital cross-connect in response to receiving the connection modify command at the first switching circuit;

reserving second additional resources for the existing connection at the digital cross-connect and forwarding the path setup message to the second switching circuit in response to receiving the path setup message at the digital cross-connect;

reserving third additional resources for the existing connection at the second switching circuit, virtually combining the third additional resources with the existing connection at the second switching circuit, and launching a path acknowledge message to the digital cross-connect in response to receiving the path setup message at the second switching circuit;

virtually combining the second additional resources with the existing connection at the digital cross-connect and forwarding the path acknowledge message to the first switching circuit in response to receiving the path acknowledge message at the digital cross-connect; and virtually combining the first additional resources with the existing connection at the first switching circuit in response to receiving the path acknowledge message at the first switching circuit.

\* \* \* \* \*